US006369933B1

(12) United States Patent
O'Callaghan

(10) Patent No.: US 6,369,933 B1
(45) Date of Patent: Apr. 9, 2002

(54) OPTICAL CORRELATOR HAVING MULTIPLE ACTIVE COMPONENTS FORMED ON A SINGLE INTEGRATED CIRCUIT

(75) Inventor: Michael J. O'Callaghan, Louisville, CO (US)

(73) Assignee: Display tech, Inc, Longmont, CO (US)

( * ) Notice: Subject to any disclaimer, the term of this patent is extended or adjusted under 35 U.S.C. 154(b) by 0 days.

(21) Appl. No.: 09/542,554

(22) Filed: Apr. 3, 2000

Related U.S. Application Data

(63) Continuation-in-part of application No. 09/238,311, filed on Jan. 28, 1999, now Pat. No. 6,247,037.

(51) Int. Cl.[7] .............................. G02F 1/03; G02F 1/29
(52) U.S. Cl. ........................ 359/247; 359/316; 359/318
(58) Field of Search ................................ 359/247, 263, 359/315, 316, 318

(56) References Cited

U.S. PATENT DOCUMENTS

| | | | | |
|---|---|---|---|---|
| 4,573,198 A | | 2/1986 | Anderson | 382/211 |
| 5,073,006 A | | 12/1991 | Horner et al. | 359/561 |
| 5,148,496 A | | 9/1992 | Anderson | 382/211 |
| 5,311,349 A | * | 5/1994 | Anderson | 359/223 |
| 5,311,359 A | | 5/1994 | Lucas et al. | 359/561 |
| 5,339,090 A | * | 8/1994 | Crossland | 345/90 |
| 5,418,380 A | * | 5/1995 | Simon | 250/550 |
| 5,452,137 A | | 9/1995 | Lucas | 359/561 |
| 5,748,164 A | | 5/1998 | Handschy et al. | 345/89 |
| 5,859,728 A | | 1/1999 | Colin et al. | 359/561 |
| 6,215,547 B1 | * | 4/2001 | Ramanujan | 355/67 |

OTHER PUBLICATIONS

A. Vander Lugt; Signal Detection by Complex Spatial Filtering; 1964;, IEEE Transactions on Information Theory, vol. IT–10, pp. 139–145.

David L. Flannery, Anne Marie Biernacki, John S. Loomis, and Steven L. Cartwright; Real–time Coherent Correlator using Binary Magnetooptic Spatial Light Modulators at Input and Fourier Planes; Feb. 1996; Applied Optics, vol. 25, No. 4.

(List continued on next page.)

*Primary Examiner*—Ricky Mack
*Assistant Examiner*—Gary O'Neill
(74) *Attorney, Agent, or Firm*—Robert G. Crouch

(57) ABSTRACT

An optical correlator includes a first reflective mode spatial light modulator for inputting an input image and a second reflective mode spatial light modulator for inputting a reference image for comparing with the input image. The optical correlator also includes an optics arrangement for (i) directing light into the first spatial light modulator, (ii) directing light along a first optical path from the first spatial light modulator into the second spatial light modulator, and (iii) directing light along a second optical path from the second spatial light modulator into an image plane. The optics arrangement includes a first lens having a focal length f1 and a second lens having a focal length f2. The first lens is positioned substantially adjacent the first spatial light modulator and the second lens is positioned substantially adjacent the second spatial light modulator. In one aspect of the invention, the spatial light modulators have their individual respective backplanes formed as two separate portions of a single integrated circuit die. In another aspect of the invention, the optics arrangement is configured such that the optical correlator does not need to be configured as a 2*f* optical correlator with the length of the first optical path from the first lens to the second spatial light modulator being substantially equal to the length of the second optical path from the second lens to the image plane.

10 Claims, 9 Drawing Sheets

OTHER PUBLICATIONS

Michael J. O'Callaghan and Stephen H. Perlmutter; Compact Optical Processing Systems using Off–axis Diffractive Optics and FLC–VLSI Spatial Light Modulators; Aug. 1996; SPIE conference on Signal & Image Processing.

Michael J. O'Callaghan, David J. Ward, Stephen H. Permutter, Lianhau Ji, and Christopher M. Walker; Highly Integrated, Compact, Optical Correlators using FLC–VLSI Spatial Light Modulators and Diffractive Optics; Jan. 1998, SPIE conference on Micro–Optics Integration and Assemblies.

Michael J. O'Callaghan, David J. Ward, Stephen H. Permutter, Lianhua Ji, and Christopher M. Walker; A Highly Integrated Single–chip Optical Correlator; Jul. 1998, SPIE conference on Algorithms, Devices, and Systems for Optical Information Processing.

* cited by examiner

W = 2.756 MM (WIDTH OF 212X212 PIXEL SLMS)
W2 = 3.328 MM (WIDTH OF 256X256 PIXEL IMAGER)
S = 5.512 MM (CENTER-TO-CENTER SPACING OF SLMS)

OPTICAL CORRELATOR HAVING MULTIPLE ACTIVE COMPONENTS FORMED ON A SINGLE INTEGRATED CIRCUIT

CROSS REFERENCE TO RELATED APPLICATION

The present invention is a continuation-in-part of U.S. patent application Ser. No. 09/238,311 now U.S. Pat. No. 6,247,037 entitled "OPTICAL CORRELATOR HAVING MULTIPLE ACTIVE COMPONENTS FORMED ON A SINGLE INTEGRATED CIRCUIT", filed Jan. 28, 1999, which application is incorporated herein by reference.

GOVERNMENT CONTRACT CLAUSE

This invention was made with Government support under contract DAAL01-95-C-0051 awarded by the Army Research Laboratory. The government has certain rights in this invention.

BACKGROUND OF THE INVENTION

The present invention relates generally to optical correlators and more specifically to a compact optical correlator having more than one of its active components formed as a single integrated circuit.

The structure, operation, and potential applications of the classical coherent optical correlator are well known. Optical correlators exist in several distinct optical architectures. However, all such architectures generally include a source of coherent light, an input plane for inputting an input image, a filter plane, and an image plane. A transform lens is used to form the Fourier transform of the input image at the filter plane. The filter plane is used to input a filter, comparison, or reference image that selectively passes Fourier components. A second lens performs a second Fourier transform and a correlation that is the optical correlation of the input image and the filter image. This optical correlation is the output of the correlator and may be recorded photographically or electronically for further use at the image plane.

In an early optical correlator architecture, the input mechanism and the filter mechanism typically consisted of photographic transparencies. The entire optical system worked in transmission from the input plane through the output on the image plane. An example of this type of system is the classical Vander Lugt 4*f* correlator. Examples of this type of correlator are described in a paper entitled "Signal Detection By Complex Spatial Filtering" by A. Vander Lugt published in IEEE *Transactions on Information Theory*, Volume IT-10, pages 139–145, 1964.

The overall size of the optical system of a 4*f* correlator is determined by the fact that the optical path from the input plane to the correlation plane amounts to four times the common focal length of the two lenses. Later, other correlator architectures were proposed in an effort to reduce the size of correlators. Some examples of these attempts to reduce the size of correlators include the correlators disclosed in U.S. Pat. No. 5,073,006 issued to Homer et al. and a paper entitled "Real-time Coherent Correlator Using Binary Magnetooptic Spatial Light Modulators at Input and Fourier Planes" by David L. Flannery, Anne Marie Biernacki, John S. Loomis, and Stephen L. Cartwright and published in *Applied Optics*, Volume 25, Number 4, on Feb. 15, 1986. Some of these architectures are called 2*f* correlators, since in accordance with these optical designs, the optical path length from the input plane to the image plane is only twice the focal length of the Fourier transform lens. These more compact architectures also originally operated in transmission.

A major step toward practical utility of correlators came with the development of spatial light modulators (SLMs). These devices consist of an array of individual, electrically addressable pixels that can be used to replace the photographic transparencies in the input and filter planes. Now, instead of the painstaking production and placement of transparencies in these planes, arbitrary input images and filters can be quickly put into place electronically, including inputs which are gathered from electronic video or still cameras. The original SLMs were also transmissive devices in which light passes through the SLM, picking up the appropriate image in the process.

Another major step to practicality was made with the development of reflective spatial light modulators such as those disclosed in U.S. Pat. No. 4,573,198 issued to Anderson. These devices also consist of an array of electrically addressable pixels, but the reflective SLMs operate in reflection while acquiring the image held on the pixels. The first such reflective SLMs were magneto-optic in operation. Later reflective SLMs based on liquid crystal materials placed on standard silicon CMOS active matrix backplanes were developed. Examples of this type of reflective SLM are disclosed in U.S. Pat. No. 5,748,164, issued to Handschy et al, which is incorporated herein by reference.

Following this advance of utilizing reflective spatial light modulators, correlator optical layouts were proposed such as those disclosed in U.S. Pat. No. 5,148,496 issued to Anderson. These layouts utilized non-plane mirrors in the place of the lenses, allowing yet additional reduction in size. Still later, Applicant found that correlator designs could be further reduced in size by the use of diffractive optical elements arranged with reflective SLMs in a bi-planar geometry. Correlators of this configuration were disclosed by Applicant in a paper entitled "Compact Optical Processing Systems Using Off-Axis Diffractive Optics and FLC-VLSI Spatial Light Modulators" presented at the *SPIE conference on Signal & Image Processing* Aug. 4–9, 1996, which paper is incorporated herein by reference. This reduction in size of the correlator was made possible by the fact that diffractive optical elements can also be made to operate in a reflective mode, thereby providing additional folding of the system.

Despite the advances in SLM technology and passive optical devices which have led to a reduction in overall size of optical correlators, the practicality of optical correlators also suffers from a different kind of problem. The proper operation of an optical correlator depends critically on maintaining the correct position and orientation of the many components making up the correlator to within tolerances comparable to the wavelength of the light employed. Because of these very tight tolerances, the spatial light modulators, the lenses, and the image recording device on the image plane all need to be mounted in such a way as to provide for moving them fractions of a wavelength while simultaneously pointing them at the proper angle. In many cases, these angles must be controlled to very tight tolerances. This need has traditionally been met in the past by fixing the components to an optical breadboard using translation and rotation mounts and then individually adjusting the mounts until the proper relative positions and orientations are achieved.

While the optical breadboard approach is suitable for experimental purposes, the resulting correlator is susceptible to changes of temperature or other external forces that can perturb the careful adjustments and impair the correlators performance. Therefore, this optical breadboard approach is not very suitable for a correlator that is to be used in commercial products that need to be robust.

One approach to improving the stability of a correlator against thermal and mechanical perturbations was disclosed in U.S. Pat. No. 5,311,359, issued to Lucas et al, and U.S. Pat. No. 5,452,137, issued to Lucas. In this approach, the superstructure of the optical correlator is machined from a single block of low thermal expansion glass. The correlator components are positioned against the glass block and then glued into position. This approach provides a very robust, rigid structure that is highly resistant to both mechanical and thermal perturbations. However, this approach does nothing to resolve the inherently difficult problems associated with the need to properly position and orient the various components of the optical correlator in the first place. Despite the robust configuration of this approach, the painstaking manual adjustments required to properly orient the components, which must be made differently for each correlator, make the cost of the resulting instrument too high for it to gain widespread commercial application.

Accordingly, it has proved very difficult to provide an inexpensive, yet robust optical correlator because of this problem that each of the components making up an optical correlator has several degrees of freedom that must be properly constrained and mutually adjusted in order to allow for the correct operation of the optical correlator. This problem currently prevents realization of many of the potential applications for optical correlators in the commercial arena. The present invention addresses this problem by providing an optical correlator that has substantially reduced degrees of freedom for many of the components making up the correlator. The present invention also provides a configuration that may be provided in a package much smaller and less expensive than was previously possible. The combination of these advances provides a correlator that may be relatively easily produced for commercial applications.

Accordingly, it is an object of the invention to provide new and improved correlators through the use of optical components in novel configurations that are easier and less costly to assemble.

It is a further object of the invention to provide methods for making correlator components in which multiple components are integrated together in a manner that reduces the number of degrees of freedom required to be adjusted to align the correlator.

It is a further object of the invention to provide new and improved correlators and methods for making correlator components to reduce the number of individual components that must be assembled to produce a correlator.

It is a further object of the invention to provide new and improved correlators and methods for manufacturing correlator components that will result in more rugged correlators that are able to better withstand thermal and mechanical perturbations.

It is a further object of the invention to provide a method for manufacturing correlator components that will reduce the cost of production and assembly of optical correlators and thereby enable more widespread application of optical correlators.

It is a further object of the invention to increase the system-level integration of the electronics of a correlator system by incorporating these electronics into a single correlator integrated circuit chip.

SUMMARY OF THE INVENTION

As will be described in more detail hereinafter, an optical correlator including a compound electro-optical component is disclosed. In one embodiment, the optical correlator includes a first and a second reflective spatial light modulator for forming electro-optical patterns of light. Each spatial light modulator has a reflective backplane and the spatial light modulators are substantially coplanar. In accordance with the invention, the spatial light modulators have their individual respective backplanes formed as two separate portions of a single integrated circuit die. The optical correlator also includes an optics arrangement for (i) directing light from a source of light into the first spatial light modulator, (ii) directing light along a first optical path from the first spatial light modulator into the second spatial light modulator, and (iii) directing light along a second optical path from the second spatial light modulator into an optical image plane.

In another embodiment, the optics arrangement of the optical correlator includes at least one mirror for folding the first and second optical paths. The optics arrangement may include a plurality of mirrors for folding both the first and second optical paths a plurality of times. In one version, at least some of the plurality of mirrors are located substantially coplanar with and adjacent to the compound electro-optical component. In this version, the mirrors that are substantially coplanar and adjacent to the compound electro-optical component may be supported on the same substrate as the compound electro-optical component.

In another embodiment, the optical correlator includes a first reflective mode spatial light modulator for inputting an input image and a second reflective mode spatial light modulator for inputting a reference image for comparing with the input image. The optical correlator also includes an optics arrangement for (i) directing light into the first spatial light modulator, (ii) directing light along a first optical path from the first spatial light modulator into the second spatial light modulator, and (iii) directing light along a second optical path from the second spatial light modulator into an image plane. The optics arrangement includes a first lens having a focal length f1 and a second lens having a focal length f2. The first lens is positioned substantially adjacent the first spatial light modulator and the second lens is positioned substantially adjacent the second spatial light modulator such that the length of the first optical path from the first lens to the second spatial light modulator is not substantially equal to the length of the second optical path from the second lens to the image plane.

In one version of the immediately above described embodiment, the first and second spatial light modulators include pixel arrays of individually addressable pixels. The first and second spatial light modulators have pixel arrays with the same number of pixels along corresponding edges of the spatial light modulators with the pixel arrays of the first and second spatial light modulators having pixel pitches of P1 and P2 respectively. The focal length f1 of the first lens is selected such that the first lens is able to image a point source of light in the plane in which the second spatial light modulator is located. Preferably, the first optical path from the first lens to the second spatial light modulator has a length of f where f is determined by $f=N\ P1\ P2/\lambda$. In this formula, N is the number of pixels per edge of the array of pixels of the spatial light modulators and $\lambda$ being the wavelength of the light being used in the optical correlator. Additionally, in the case in which the optics arrangement includes a point source of light located a distance d from the first lens, the focal length f1 of the first lens is determined by $1/f1=1/d+1/f$.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
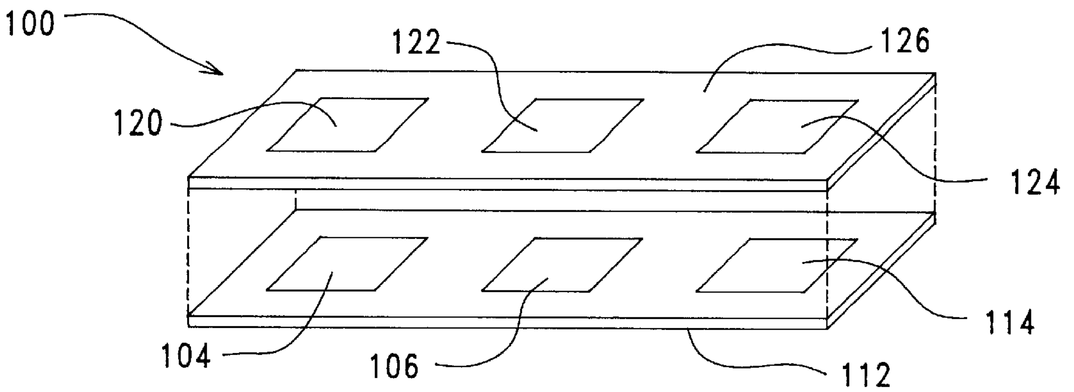
FIG. 1 is a diagrammatic exploded view of one embodiment of a compound electro-optical component assembly in accordance with the invention.

An invention is described herein for providing an optical correlator and a compound electro-optical component for use in devices such as optical correlators, optical image processors, or optical signal processors. In the following description, numerous specific details are set forth in order to provide a thorough understanding of the present invention. It will be obvious, however, to one skilled in the art, that the present invention may be embodied in a wide variety of specific configurations. Also, well known processes such as lithographic process and other manufacturing processes used in the production of VLSI and CMOS integrated circuit die have not been described in detail in order not to unnecessarily obscure the present invention.

Turning to the drawings, wherein like components are designated by like reference numerals throughout the various figures, attention is initially directed to FIGS. 1–2 and 4–6. These figures illustrate a first embodiment of a compound electro-optical component assembly 100 designed in accordance with the invention. For purposes of illustration, the use of compound electro-optical component assembly 100 will be described throughout this specification as being used in an optical correlator such as optical correlator 102, shown best in FIG. 2. Although compound electro-optical component assembly 100 will be described as being used in an optical correlator, it should be understood that it may be utilized in other devices such as optical image processors, optical signal processors, or other such devices and still remain within the scope of the invention.

As will be described in more detail hereinafter, compound electro-optical component assembly 100 includes two reflective spatial light modulators (SLMs) 104 and 106. SLMs 104 and 106 have reflective backplanes 108 and 110, best shown in FIG. 4. As illustrated in the drawings, SLMs 104 and 106 are substantially coplanar. In accordance with one aspect of the invention, SLMs 104 and 106 have their individual respective backplanes 108 and 110 formed as two separate portions of a single integrated circuit die 112. In accordance with another aspect of the invention, single integrated circuit die 112 may further include at least a portion of an optical imager 114 formed as a separate portion of single integrated circuit die 112. In the case of optical correlator 102, imager 114 is used for converting a pattern of light into electrical data signals.

In the embodiment illustrated in FIGS. 1–2 and 4–6, SLMs 104 and 106 are ferroelectric liquid crystal spatial light modulators such as those disclosed in the previously cited Handschy patent which was incorporated herein by reference. These types of SLMs modulate the polarization of light directed into the SLM in order to produce a desired pattern of polarization modulated light. Although the SLMs illustrated in this embodiment are described as being ferroelectric liquid crystal light polarization modulating SLMs, this is not a requirement of the invention. Instead, the present invention would equally apply to a wide variety of SLMs so long as the SLMs include a reflective backplane that may be produced as a portion of an integrated circuit die. For example, other types of SLMs such as nematic liquid crystal SLMs and deformable mirror device (DMD) SLMs would equally fall within the scope of the invention.

Figure 2:
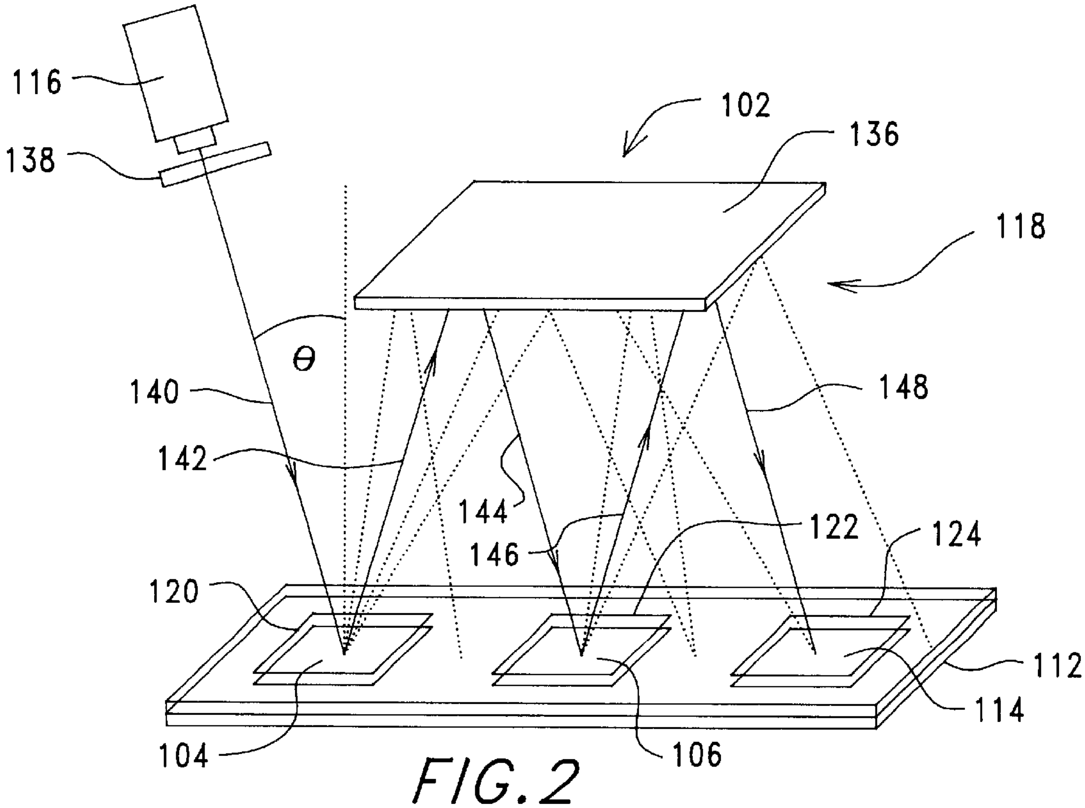
FIG. 2 is a diagrammatic perspective view of one embodiment of a bi-planer 2*f* optical correlator in accordance with the invention that includes the compound electro-optical component of FIG. 1.

As illustrated in FIG. 2, optical correlator 102 further includes a source of coherent light 116. This source of light is typically provided in the form of a laser, a laser diode, or some other conventional source of coherent light. Although only a few specific examples of possible sources of coherent light are given here, it should be understood that the present invention is not limited to these specific examples. Instead, any sources of coherent light may be used and still remain within the scope of the invention.

Optical correlator 102 also includes an optics arrangement 118 for directing light through the optical correlator and performing Fourier transforms of the images produced by the SLMs. In the embodiment illustrated in FIGS. 1–2 and 4–6, optics arrangement 118 includes a first diffractive lens 120 associated with SLM 104, a second diffractive lens 122 associated with SLM 106, and a third diffractive lens 124 associated with imager 144. In the embodiment illustrated, diffractive lenses 120, 122, and 124 are all formed into a single substrate 126. Substrate 126 may be any suitable substrate such as glass, plastic, or any other appropriate material. Although lenses 120, 122, and 124 are described as being diffractive lenses formed into a single substrate, it should be understood that these lenses may be provided in a variety of forms including individually formed diffractive lenses, refractive lenses, or any other suitable optical element capable of performing a Fourier transform.

Figure 4:
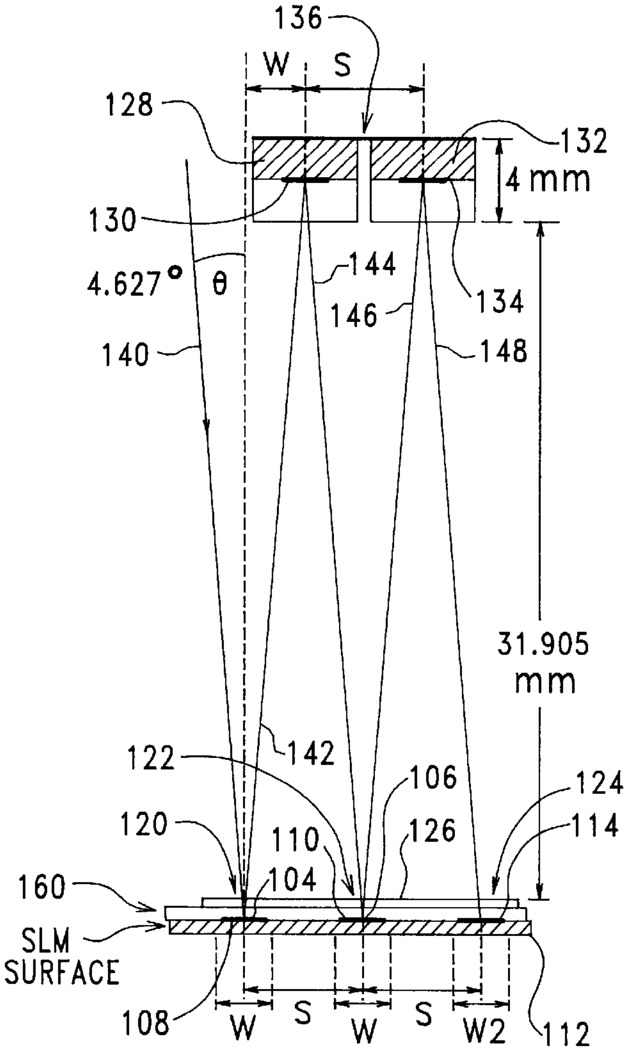
FIG. 4 is a diagrammatic side view of a specific example of the bi-planar 2*f* optical correlator of FIG. 2.

Optics arrangement 118 further includes a first mirror 128 and an associated first polarizer 130 best shown in FIG. 4. Optics arrangement 118 also includes a second mirror 132 and an associated second polarizer 134 located adjacent to first mirror 128 and associated first polarizer 130. As will be described in more detail hereinafter, mirrors 128 and 132 and polarizers 130 and 134 are preferably provided as a single assembly 136. Preferably, the mirrors are located approximately in a common plane and the polarizers and the mirrors are fixed in place on assembly 136 with their positions being fixed relative to one another. Optics arrangement 118 also includes a polarizer 138 associated with light source 116 for polarizing the light directed into correlator 102.

Figure 5:
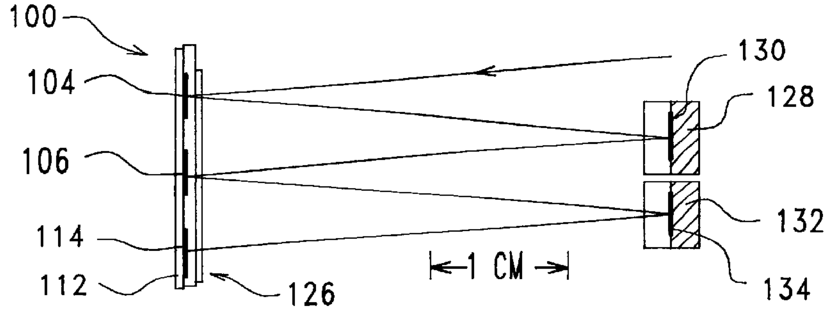
FIG. 5 is a scaled diagrammatic side view of the bi-planar 2*f* optical correlator of FIG. 4.

The basic correlator configuration illustrated in FIGS. 2, 4, and 5 is referred to as a bi-planar optical correlator. This is because all of the components of the correlator, other than the source of light, are located on one of two planes. As will be described in more detail, this configuration fixes the location of each of the elements of the correlator substantially within one of these two respective planes. This eliminates many of the degrees of freedom associated with the correlator and dramatically reduces the problems referred to in the background of the invention associated with properly orienting each of the various elements.

Now that the basic components making up correlator 102 have been described, the optical path that the light directed into the correlator follows will briefly be described. Generally, assembly 100 and assembly 136 are positioned in a bi-planar relationship as described above. With this orientation, the elements of these two assemblies cooperate to direct light through the correlator from the source of light to the imager. As shown best in FIGS. 2 and 4, polarizer 138 cooperates with light source 116 to direct polarized, coherent light into SLM 104 as indicated by arrow 140. SLM 104 reflects this light toward first polarizer 130 and associated mirror 128 as indicated by arrow 142. SLM 104 is used to input an input image by modulating the polarization of the light to form a pattern of polarization modulated light. Mirror 128 reflects any light that passes through polarizer 130 into SLM 106 as indicated by arrow 144. First diffractive lens 120 is positioned adjacent to and centered optically on SLM 104. Lens 120 is configured to produce a Fourier transform of the patterns of light formed by SLM 104 at SLM 106. This is accomplished by placing the components such that SLM 104 is located at a distance substantially equal to the focal length of lens 120 away from SLM 106 when measured along the optical path defined by arrows 142 and 144.

Similarly, SLM 106 reflects incident light toward second polarizer 134 and associated mirror 132 as indicated by arrow 146 in FIGS. 2 and 4. SLM 106 is used to input a comparison or filter image for comparing with the input image produced by SLM 104. Mirror 132 reflects any light that passes through polarizer 134 into imager 114 as indicated by arrow 148. Second diffractive lens 122 is positioned adjacent to and centered optically on SLM 106. Also, second lens 122 is configured to produce a Fourier transform of the patterns of light formed by SLM 106 at imager 144. This is accomplished by placing the components such that SLM 106 is located at a distance equal to the focal length of lens 122 away from imager 114 when measured along the optical path defined by arrows 146 and 148. Therefore, when input patterns of light are formed by the SLM 104 and comparison or filter patterns of light are formed by the SLM 106, output optical patterns are formed on imager 114 that constitute the correlation of the Fourier transform of the input patterns of light with the comparison or filter patterns of light.

Figure 7:
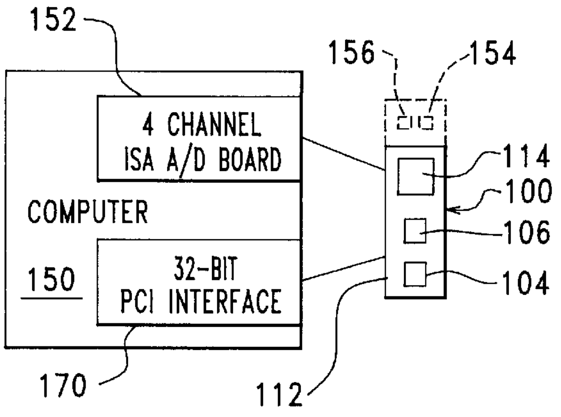
FIG. 7 is a schematic diagram of one embodiment of an overall system for controlling the operation of an optical correlator in accordance with the invention.

Now that the basic operation of correlator 102 has been described, a system for controlling the operation of correlator 102 will be briefly described with reference to FIG. 7. As described above, all of the active components of correlator 102 are located on integrated circuit die 112. Therefore, all of the inputs and outputs of the system, including input data representing the input image, input data representing the comparison or filter image, and output data representing the output of the imager must be connected to integrated circuit die 112. This may be accomplished by connecting the appropriate input lines between any suitable and readily providable input device such as computer 150 and integrated circuit die 112 as illustrated in FIG. 7. Similarly, output lines may be provided to connect the output of imager 114 to any suitable and readily providable output device such as an interface board 152 within computer 150.

In order to further integrate the system of the present invention, integrated circuit die 112 of compound electro-optical component assembly 100 may further include electronic circuitry 154 for coordinating the operations of SLMs 104 and 106. Additionally, integrated circuit die 112 may include electronic circuitry 156 (i) for coordinating the operations of imager 114 with the operations of SLMs 104 and 106, (ii) for communicating electrical data signals from the imager to external circuitry, (iii) for storing digital data, (iv) for electronically processing digital data, (v) for receiving digital data from an external data source, (vi) for converting digital data to analog data or converting analog data to digital data, or (vii) for electronically processing analog data.

Now that the basic components and operation of correlator have been described, some of the advantages provided by the present invention and additional aspects of the invention will be described using a detailed example of a correlator designed in accordance with the invention. As mentioned in the background, high-speed optical image processing is becoming practical due to advances in spatial light modulator (SLM) and imager technologies. However, in order to become commercially viable, these systems need to be inexpensive and they must be compatible with conventional electronic digital computer systems.

Preferably, a commercial optical correlator would be provided as an easy to install and operate plug-in component for a conventional electronic digital computer system. Additionally, it is desirable that the optical correlator be provided at a compelling cost/performance advantage over currently available optical correlators. The present invention discloses correlator architectures that combine liquid-crystal-on-VLSI spatial light modulators, a CMOS active pixel imager (the SLMs and imager are on a common silicon die), and diffractive optics, to produce high performance correlators that are more compact and less expensive to build than previous designs.

As will be described in more detail hereinafter, it is feasible to build a 512×512 pixel correlator with an optical system volume as small as 1.6 $cm^3$ (excluding laser, laser optics, housing, electronic interconnects, etc). A 212×212 pixel prototype correlator was built to test these design concepts. Features of this prototype system will now be described in detail to further illustrate the features of the present invention.

FIGS. 1–2 and 4–6 illustrate the basic architecture of the prototype correlator. In this specific example, SLMs 104 and 106 are 212×212 pixel ferroelectric-liquid-crystal-on-VLSI (FLC-VLSI) spatial light modulators and imager 114 is a 256×256 pixel active pixel sensor (APS) imager. In accordance with the invention and as described above, the CMOS integrated circuit 112 contains at least portions of SLMs 104 and 106 and imager 144.

As described in more detail in the Handschy patent that was incorporated herein by reference, the SLMs include a window 160 (shown in FIG. 4) that is attached to integrated circuit 112 leaving a gap between window 160 and integrated circuit 112 of about 1 micron, this gap is filled with ferroelectric liquid crystal material. A second window or substrate 126 has three diffractive lenses (120, 122, and 124) formed in its surface. The second window is attached to the first so that its lenses align with the two SLMs 104 and 106 and imager 144.

As shown in the figures and described above, collimated linearly polarized light from laser 116 is reflected from SLM 104 where an input image is displayed. Lens 120 above SLM 104 projects the Fourier transform of the light from the input image on input SLM 104 onto the second SLM 106 after reflection from polarizing mirror combination 128 and 130. The polarizer converts the polarization modulation of SLM 104 to intensity modulation. A filter image is displayed on second SLM 106 and second lens 122 projects the Fourier transform of the light reflecting from SLM 106 onto imager 114 after reflection from second polarizing mirror 132 and 134. The light reflecting from SLM 106 is the product of the filter image and the Fourier transform of the input image. In this embodiment, second polarizer 134 is oriented so that second SLM 106 produces binary phase modulation. Lens 124 is optionally positioned over the imager and if included is used to correct a small geometric scaling error that may exist if the lens were omitted.

Figure 3:
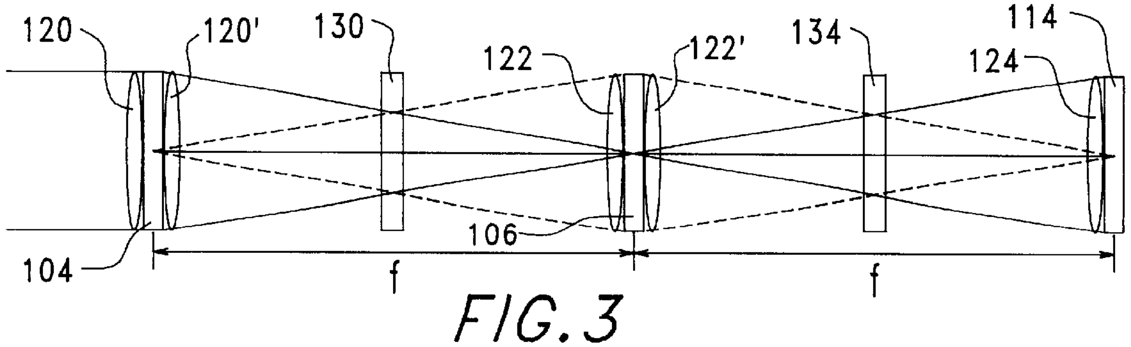
FIG. 3 is a simplified schematic illustrating the approximate transmissive equivalent of the reflective mode 2*f* optical correlator of FIG. 2.

A simplified illustration approximating the architecture of the **2*f* correlator used in the above described system is shown in FIG. 3. In this figure, the SLMs are shown for illustrative purposes as transmissive rather than reflective. Because this figure is representing the reflective system described above, lens 120 is represented by two lenses 120 and 120' that are located on opposite sides of SLM 104 and lenses 120 and 120' are identical to one another. The same is true for lens 122 which is represented by lenses 122 and 122'. In this case, lens 124 is identical to 120'**.

In this simplified treatment, it is assumed that the distance between lenses 120 and 120' and input SLM 104 is zero, and lenses 122, 122' and 124 are treated similarly. Lenses 120 and 120' have a combined focal length of f and they are used to project the Fourier transform of input SLM 104 onto the filter plane SLM 106. In a symmetrical optical system, with pixel sizes of both SLMs and imager being equal, the combined focal length of lenses 122 and 122' is f/2 and they project the Fourier transform of light reflected from the filter SLM onto the imager.

The focal lengths of the lenses are dictated by (i) the shortest spatial wavelength that can be displayed by the SLMs, that is $\Lambda=2p$ where p is the pixel pitch, (ii) the optical wavelength $\lambda$, and (iii) the number of pixels in the SLMs. The diffraction angle at the highest spatial frequency is approximately $\theta=\lambda 2p$. At this spatial frequency the focused spot of light should fall on the edge of the filter plane SLM, i.e. at a distance of Np/2 from the filter plane's center: $Np/2=f\theta$. The quantity N is the number of pixels per edge of an N×N pixel SLM. The focal length of lens combination 120 and 120' must therefore be $f\text{-}Np^2/\lambda$. The focal length of the individual lenses 120 and 120' will be twice this, $f_{120}=2f$, so their F/# is equal to $2f/Np=2p/\lambda$. Assuming that the pixel size of the imager is the same as the SLMs, the focal length $f_{122}$ must also be equal to f. The focal length of the combined lenses 122 and 122' is f/2, and these lenses project an image of the input SLM onto the imager. The F/# of lens 122 and 122' is equal to $f/Np=p/\lambda$ and is half that of lens 120 and 120'.

The above description applies to a symmetrical system in which the pixel pitch of the SLMs and imager are equal to one another. The design principles used to select focal lengths apply equally to the case of unequal pixel pitches; it is necessary to scale the Fourier transform of the input SLM to match the size of the filter SLM. If the pixel pitch of the input SLM is $p_1$ and the pixel pitch of the filter SLM is $p_2$, then the focal length f of lens combination 120 and 120' becomes $f=Np_1p_2/\lambda$. Similarly, and accounting for wave front curvature at the filter SLM, the focal length f' of the combined lenses 122 and 122' becomes $f'=f(p_1/p_3+1)^{-1}$ where $p_3$ is the pixel pitch of the imager.

The ferroelectric liquid crystal SLMs used for this example modulate the polarization state of light. These SLMs were provided by Displaytech, Inc of Longmont Colo. Displaytech builds SLMs of this type ranging from 256×256 pixels to 1280×1024 pixels. The linear polarization of the light is either left unchanged or rotated by approximately 90°. The first polarizer 130 is used to convert the polarization modulation to intensity modulation. The second polarizer 134 can be oriented so that the filter plane SLM acts either as a spatial bandpass filter (intensity modulation) or as a binary phase-only filter.

For the proper operation of the system, the filter plane SLM must be accurately aligned with the optical Fourier transform of the input SLM to within about 10% of the width of an individual pixel. The pixel pitches of Displaytech's SLMs used in this type of system range from 15 $\mu$m down to 7.6 $\mu$m. Therefore, lateral alignment must be maintained to a precision of 1.5 $\mu$m to 0.8 $\mu$m.

The rotational alignment of the filter plane and input plane SLMs must be maintained to within about $\phi=0.1p/(Np/2)=0.2/N$. For a 256×256 pixel SLM an angular precision of 0.8 milliradians (2.7 arc minutes) is required, and for 1024×1024 pixel SLMs a precision of 0.2 milliradians (0.7 arc minute) is required.

Light diffracted by the shortest spatial wavelength ($\theta=2p$) of the input SLM is focused to a spot at a distance $r=f\lambda/2p=Np/2$ from the center of the filter plane. In order for this spot to fall within 0.1p of the correct position it is required that the optical wavelength be correct to within $\Delta\lambda/\lambda=0.1p/(Np/2)=0.2/N$. For N=256 this implies that the laser wavelength must be stable to within 0.08%, and for N=1,024 it must be stable to within 0.02%.

The conventional **2*f* correlator described above for FIG. 3 uses five lenses, two polarizers, two spatial light modulators, and an imager. Each of these ten components must be separately aligned into their correct positions and angular orientations, and they must be mounted on a common chassis. As described above, the more compact architecture of the present invention is shown in FIGS. 1–2 and 4–6. The two SLMs 104 and 106 and imager 114 are built into a single CMOS VLSI die. Diffractive lenses 120, 122, and 124 are built into a single plate of glass that is attached to the SLM/SLM/imager die 112 to form a single robust assembly. Transmissive polarizers 130 and 134 are attached to the face of folding mirrors 128 and 132**, which may be provided as a single mirror surface. As mentioned above, this architecture has only two components that need to be aligned and mounted within the correlator chassis instead of ten. Precise positional and rotational alignment of the SLMs and imager are achieved automatically by the VLSI fabrication process.

As is known in the art, CMOS VLSI fabrication processes are capable of providing extremely accurate relative positional relationships for elements formed on an integrated circuit die. This is because the lithographic patterns that are used to form the die during the VLSI process may be provided with very tight tolerances and very accurate relative positional relationships for the various portions of the pattern. The VLSI process also provides extremely tight tolerances from die to die. This is because the same very precise patterns are used to pattern or etch the various elements into each integrated circuit die.

Because the patterns used in the VLSI process may be produced at these very high positional accuracies and to these very tight tolerances, the SLMs and imager of the present invention may be produced on a single integrated circuit die with very accurate positional and rotational alignment. For example, the VLSI process may be used to insure that the corresponding rows of the SLMs and imager are collinear and parallel with one another. It may be used to ensure the SLMs have the same pixel pitch and are the same overall size. This process also can be used to ensure very accurate spacing between the two SLMs and between the filter SLM and the imager. Because of this inherent positional accuracy available in the VLSI process and in accordance with the invention, an optical correlator having its SLMs and imager formed on a single integrated circuit die may eliminate many of the degrees of freedom typically associated with a conventional optical correlator. This dramatically reduces the costs of producing an optical correlator.

A potential problem with this architecture is that unwanted light may reach the imager and degrade the correlator's signal to noise ratio. When no image is present on either SLM (all the pixels are in the same state) the chief ray of the optical system propagates through the correlator as shown in FIGS. 2 and 4 and as described above. In the specific embodiment being described, this system uses an off-axis angle of θ. Even in this simple case, however, the chief ray is diffracted into an infinite set of diverging rays (a few are shown as dashed lines in FIG. 2 with an angular spacing of $(\Delta\phi_x, \Delta\theta_y)=(\lambda/p, \lambda/p)$. Here p is the pixel pitch and λ is the wavelength of light passing through the correlator. This diffraction is due to the small gaps between pixels. When an image is displayed on input SLM 104 each of these diffracted rays becomes the center of an optical Fourier transform incident on the filter plane. A similar set of diffracted rays is produced by reflection from second SLM 106. One or more of these unwanted diffraction orders will be incident on the imager if appropriate apertures are not placed in the system and if the SLMs and imager are not spaced correctly. If the pixel pitches of the SLMs and imager are not all the same, then the diffraction angles $(\Delta\phi_x, \Delta\phi_y)$ and focal lengths change accordingly, thus necessitating a corresponding change in distances between the SLMs or between the SLMs and imager.

To eliminate this problem two apertures each having a black, non-reflective surround and a clear opening are placed at the surface of mirrors 128 and 132. Each aperture has a clear opening that is the size and shape of an SLM. The first aperture passes light propagating from the first SLM to the second, and the second passes light propagating from the second SLM to the imager. Apertures are also placed over lenses 120, 122, and 124 to block light from being reflected in the intervening spaces. Finally, and in accordance with the invention, the lateral spacing between SLM apertures is selected to be equal to the width W of an SLM as illustrated in FIG. 4. This ensures that copies of the Fourier transforms and images that are centered on the diffracted chief rays do not fall within the imager aperture. If the pixel pitches of the SLMs and imager are not all the same, then the diffraction angles $(\Delta\phi_x, \Delta\phi_y)$ and focal lengths change accordingly, thus necessitating a corresponding change in distances between the SLMs or between the SLMs and imager.

The volume of a rectangular solid that contains the correlator optical path can be computed from its height, width, and length. The length of the volume is L=5Np where N is the number of pixels on one side of a square array and p is the pixel pitch. The width is W=Np. The height H (SLM plane to the mirror plane distance) is determined by the focal length of the Fourier transform lens $f=Np^2/\lambda$ and the center-to-center spacing of the SLMs which is equal to 2Np: $H=(Np^2/2\lambda)[1-(2\lambda/p)^2]^{1/2}$. The volume is therefore $V=HWL=(5N^3p^4/2\lambda)[1-(2\lambda/p)^2]^{1/2}$.

The pixel pitch p has an enormous influence on the optical system volume. As an example consider pixel sizes of 30 μm, 15 μm, and 7.6 μm. Displaytech currently builds SLMs with pixel sizes of 15 μm and 7.6 μm. A previous generation of SLM contained 30 μm pixels. If the SLMs contain 512×512 arrays of pixels and a laser diode with a wavelength of 670 nm is used, then the volumes of the corresponding correlators would be 405 $cm^3$, 25 $cm^3$, and 1.6 $cm^3$. Therefore, reducing the pixel size by a factor of reduces the correlator volume by over two orders of magnitude.

The strong influence of pixel size on correlator volume argues for using the smallest possible pixel size. However, other consequences of using small pixels must also be considered. The off-axis angle of light traveling through the correlator (θ in FIG. 2) is specified by sin 74 =2Np/f=2λ/p. For λ=670 nm, varying the pixel size from 30 λm to 7.6 μm increases the off-axis angle from 2.6° to 10° thus increasing optical aberrations and reducing correlator performance. The F/# of lenses 120 and 122 are, respectively, $F/\#_{L1}=2f/Np=2p/\lambda$, and $F/\#_{L2}=f/Np=p/\lambda$. As pixel size is decreased from 30 λm to 7.6 μm these F/#s decrease from 90 and 45, to 23 and 11. The anticipated optimal off-axis angle for this simple optical design may be in the range of 4°–5° (to achieve near-diffraction limited performance) which implies that the optimal pixel size is in the range of 20 μm to 15 μm unless a shorter optical wavelength is used.

TABLE 1

| N | ρ (μm) | λ (nm) | L1 f (mm) | L2 f (mm) | L1 F/# | L2 F/# | H (mm) | W (mm) | L (mm) | θ | V ($cm^3$) |
|---|---|---|---|---|---|---|---|---|---|---|---|
| 212 | 13 | 532 | 1347 | 67.3 | 48.9 | 24.4 | 33.6 | 2.8 | 13.8 | 47° | 1.27 |
| 256 | " | " | 162.6 | 81.3 | " | " | 40.5 | 3.3 | 16.6 | " | 2.24 |
| 512 | " | " | 325.3 | 162.6 | " | " | 81.1 | 6.7 | 33.3 | " | 17.95 |
| 1024 | " | " | 650.6 | 325.3 | " | " | 162.1 | 13.3 | 66.6 | " | 143.63 |
| 512 | 7.6 | 670 | 88.3 | 44.1 | 22.7 | 11.3 | 21.7 | 3.9 | 19.5 | 10.2° | 1.64 |
| " | 15 | " | 343.9 | 171.9 | 44.8 | 22.4 | 85.6 | 7.7 | 38.4 | 5.1° | 25.25 |
| " | 30 | " | 1375.5 | 687.8 | 89.6 | 44.8 | 343.5 | 15.4 | 76.8 | 2.6° | 405.25 |
| 256 | 15.4 | 670 | 180.6 | 90.3 | 45.9 | 22.9 | 45.0 | 3.9 | 19.7 | 5.0° | 3.48 |
| 512 | " | " | 361.3 | 180.6 | " | " | 90.0 | 7.9 | 39.4 | " | 27.88 |
| 1024 | " | " | 722.6 | 361.3 | " | " | 180.0 | 15.7 | 78.7 | " | 223.02 |
| 256 | 12.2 | 532 | 143.4 | 71.7 | 45.9 | 22.9 | 35.7 | 3.1 | 15.6 | 5.0° | 1.74 |
| 512 | " | " | 286.9 | 143.4 | " | " | 71.4 | 6.3 | 31.3 | " | 13.96 |
| 1024 | " | " | 573.7 | 286.9 | " | " | 142.9 | 12.5 | 62.5 | " | 111.65 |
| 256 | 7.6 | 670 | 44.1 | 22.1 | 22.7 | 11.3 | 10.9 | 1.9 | 9.7 | 10.2° | 0.21 |
| 512 | " | " | 88.3 | 44.1 | " | " | 21.7 | 3.9 | 19.5 | " | 1.64 |
| 1024 | " | " | 176.6 | 88.3 | " | " | 43.4 | 7.8 | 38.9 | " | 13.16 |
| 128 | 25.0 | 850 | 188.2 | 94.1 | 58.8 | 29.4 | 46.9 | 3.2 | 16.0 | 3.9 | 2.4 |
| 256 | 25.0 | 850 | 376.5 | 188.2 | 58.8 | 29.4 | 93.9 | 6.4 | 32.0 | 3.9 | 19.2 |
| 512 | 25.0 | 850 | 752.9 | 376.5 | 58.8 | 29.4 | 187.8 | 12.8 | 64.0 | 3.9 | 154 |
| 1024 | 25.0 | 850 | 1505.9 | 752.9 | 58.8 | 29.4 | 375.6 | 25.6 | 128.0 | 3.9 | 1230 |

Table 1 illustrates the volumes of various correlator configurations using the above described relationships. These correlator optical system dimensions and volumes do not include the volume required for a housing, laser, collimating optics, electrical interconnects, etc.

Figure 6:
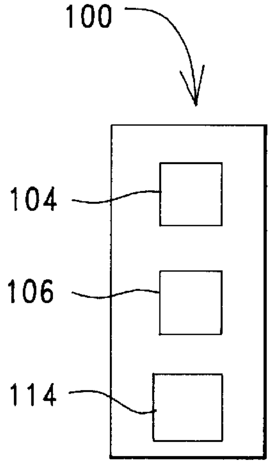
FIG. 6 is a scaled diagrammatic front view of the compound electro-optical component used in the bi-planar 2*f* optical correlator of FIG. 4.

FIGS. 4–6 illustrate the dimensions of a 212×212 pixel prototype of the compact correlator described above. This prototype was constructed to explore the engineering issues involved and to verify performance expectations. The principal difference between the prototype and the design presented above is that the folding mirror/polarizer elements 128, 130, 132, and 134 have been separated into two separate mirror/polarizers. This allows the orientation of the polarizers to be independently adjusted for testing purposes. Preferably in a production version of this embodiment, the folding mirror/polarizers would be provided as a single assembly as described above.

In each mirror assembly of the prototype, a thin dichroic polarizing sheet (130 and 134) is sandwiched between a window and a front surface mirror (128 and 132). Each pixel of the two SLMs acts like a half wave plate whose optic axis can be selectively rotated to either of two positions that are nearly 45° apart. Reflected, linearly polarized light is rotated to one of two orientations (depending on the pixel state) that differ by nearly 90°. The first polarizer, polarizer 130, is oriented to convert the polarization modulation of input SLM 104 into amplitude modulation, and the second polarizer 134 is oriented to convert the SLM's polarization modulation into binary phase modulation.

The optical path length from the first SLM to the second is dictated by the relationship $f=Np^2/\lambda$ where f is the effective focal length of lens 120 laying above SLM 104. The quantity N is the number of pixels per edge of the N×N SLM, p is the center-to-center spacing of the pixels (the pitch), and λ is the wavelength of light being used. This ensures that the optical Fourier transform of the input SLM 104 is scaled to the size of the filter plane SLM 106. In the prototype N=212, p=13 μm, λ=532 nm. Therefore, f=67.3 mm. However, this relationship assumes that the path between the SLMs is through empty space. The distance from SLM 104 to mirror 128 to SLM 106 in the prototype differs slightly from f due to the presence of glass elements, and because the lenses lie a short distance above the surfaces of the SLMs.

Light reflected from an SLM is split into multiple diffraction orders due to the array of pixels as mentioned above. It is important to prevent all but the $0^{th}$ diffraction order from reaching the imager. This is ensured by positioning the SLMs so that the lateral separation between their centers, that is spacing S in FIG. 4, is twice the width W of SLMs 104 and 106. This is also ensured by placing apertures over the SLMs and mirrors that pass only the $0^{th}$ order light as described above.

The SLMs of this prototype contain 13 μm pitch SRAM pixels and are capable of running as fast as 3,400 frames per second as implemented in the prototype correlator. The SLMs are capable of higher speeds but are limited by the simple system design of the prototype. As will be described in more detail hereinafter, the imager is a 256×256 pixel photodiode array whose pixels contain a capacitor for integrating photocharge. Imager 114 has a design speed of 2,000 frames per second. Each of the imager's 13 μm pixels also contains transistors to allow reset and buffered read out. This type of imager is commonly known as an active pixel sensor (APS).

The diffractive lenses (fabricated by Digital Optics Corporation of Raleigh North Carolina) are built using 16 phase levels. The dimensions of the prototype's optical system are shown in the first row of Table 1. The dimensions shown there are approximate because they do not take into account the fact that the lenses are located a small distance from the SLM surface, and they do not take into account portions of the optical path filled with glass instead of air. Detailed design of this optical system was carried out using Zemax and Code V.

As mentioned above, the laser wavelength must be kept constant within a range of 0.2/212×100=0.09%. If a laser diode were used with a nominal wavelength of 670 nm, its wavelength must be correct to within 0.6 nm. Diode-to-diode wavelength variations commonly span a range of about 5 nm, well outside our wavelength precision requirement. The wavelength of a typical diode laser changes at a rate of about 0.2 nm/° C. Therefore, the diode must first be calibrated and then held to within 3° C. of the required temperature. If we were using 1,000×1,000 pixel SLMs we would need to control the laser diode temperature to within about 0.6° C. For the purposes of this experiment, a commercially available compact (3 cm×3cm×6.6 cm), 532 nm, frequency doubled Nd:$YVO_4$ laser was used rather than a laser diode. The compact laser's wavelength is fixed by an atomic transition and its stability exceeds the above described stability requirements. This eliminated the need to calibrate and temperature tune a laser diode.

Referring to FIG. 7, a PCI bus computer interface 170 was built to operate the correlator and to provide data to the SLMs. A commercial 4-channel A/D board 152 was used to digitize the CMOS imager's four analog outputs.

Correlators most often use commercially available CCD imagers. CCDs have good pixel-to-pixel uniformity, good signal to noise ratio and dynamic range (8 to 12 bits), and good optical efficiency. Although very expensive, CCD imagers are available that can run at speeds of 1,000 frames/s and faster. However, in order to achieve high levels of integration and to lower cost, the SLMs and the imager are to be built on the same VLSI integrated circuit die. This means that both the SLM and the imager must be built using the same fabrication process. FLC-VLSI SLMs use fairly standard CMOS technology in which it is possible to build photodiodes and phototransistors. CCD fabrication, although similar, requires a manufacturing process that is more complex, specialized, and expensive. In the prototype correlator the imager was implemented as an array of photodiodes that are fabricated in the same CMOS process as the SLMs. The design speed of the imager is 2,000 frames/s.

Although the size of the SLMs is 212×212 pixels, the imager used in the prototype contains an array of 256×256 pixels. The SLMs must be very precisely aligned to one another so that the optical Fourier transform of the first SLM lines up with the filter displayed on the second. The output of the SLMs of the correlator, however, do not need to be as accurately aligned with the imager. By using an oversized imager, the design can accommodate some degree of misalignment at the output and not lose any information. Lateral misalignment of the correlator's output within the imager aperture can easily be compensated for in software.

Figure 8:
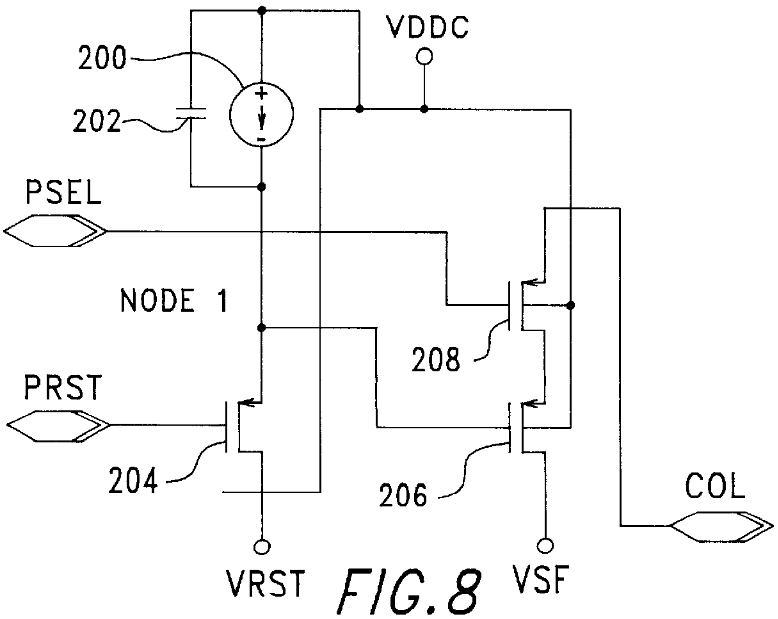
FIG. 8 is a circuit diagram of an individual pixel within a CMOS imager designed in accordance with the invention.

A circuit diagram of a single pixel of imager 114 is shown in FIG. 8. It includes a photodiode 200, an integrating capacitor 202, a reset switch 204, an output buffer 206, and a select switch 208. The fraction of the pixel's area occupied by the photodiode is approximately 58%. The remainder of the pixel's area is occupied by the circuitry. At the beginning of a cycle reset switch 204 is briefly turned ON to set node 1 of the photodiode to voltage Vrst. Light falling on the photodiode generates current that causes node 1 to rise towards Vddc. At the end of the exposure cycle, switch 208 is turned ON to pass the buffered photodiode voltage out to the pixel's column line. The 256 column lines of the array are connected to multiplexers that output the analog data from the imager on four signal lines. This type of CMOS imager is commonly known as an active pixel sensor (APS).

Figure 9A:
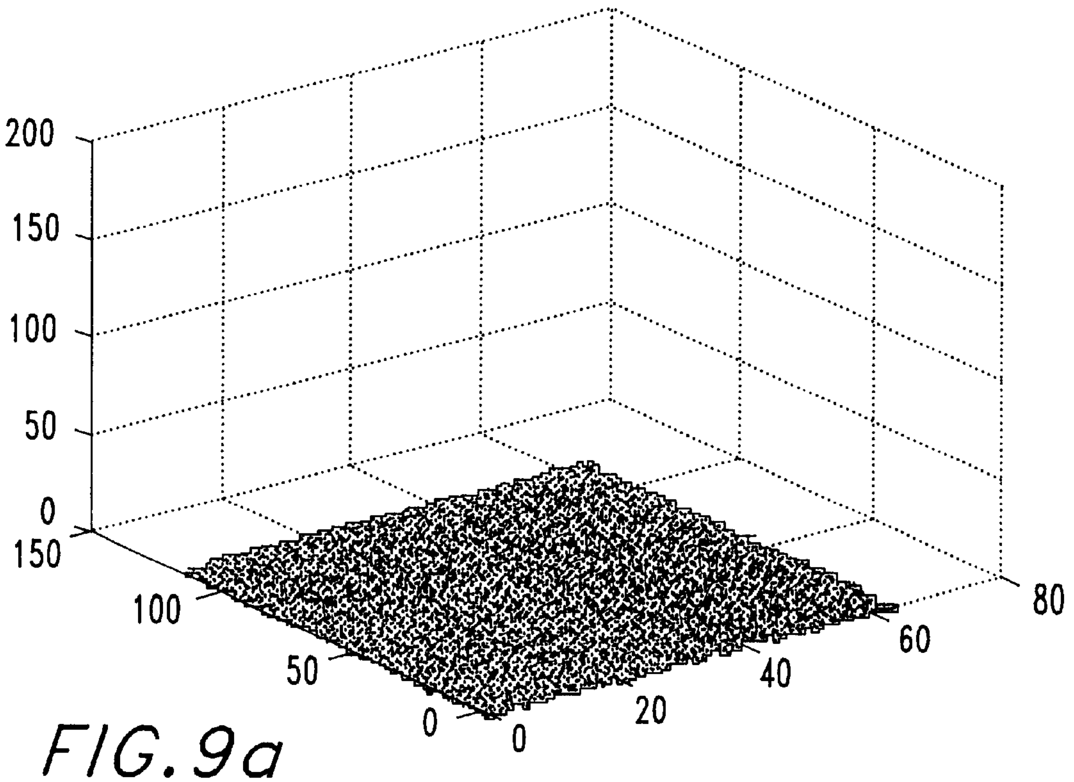
FIGS. 9*a* and 9*b* are graphs illustrating the output data from a test of a prototype of a CMOS imager utilizing the pixel configuration of FIG. 8.
Figure 9B:
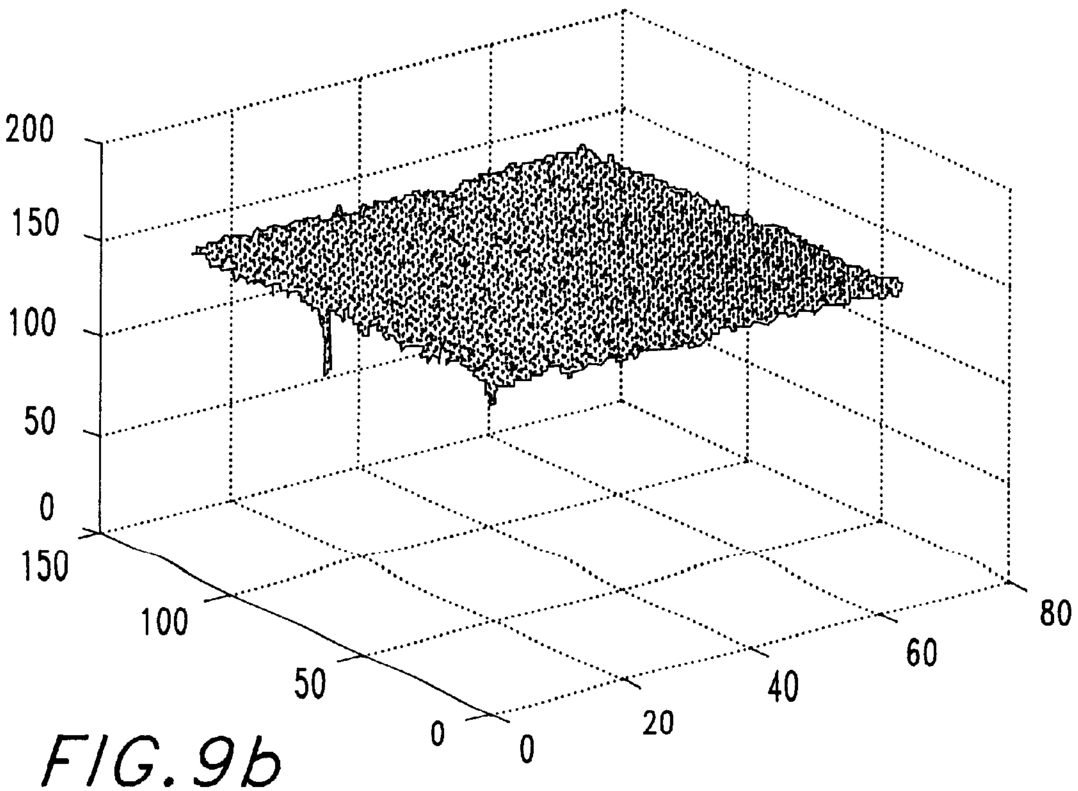

Prior to designing the die containing the SLMs and imager, a small test chip containing only a 128×96 pixel portion of the imager was built. The test chip also contained the associated row and column circuitry and the multiplexers and output buffers. FIGS. 9*a* and 9*b* show plots of data read out from a portion of the imaging array on the test chip. The plot of FIG. 9*a* shows the output of the chip with no light incident on the imager, and the plot of FIG. 9*b* shows the output with fairly uniform illumination from an incoherent white light source. These plots are averages of 10 frames sampled from the imager.

The pixel output voltages were digitized by an 8-bit data acquisition board, so the unscaled, digitized values are in the range of 0 to 255. The standard deviation of the output from each pixel over the 10 frames was computed to determine the level of temporal noise. The average of that standard deviation over all pixels in the dark was 0.9, and with a uniform illumination level of about 160 the average standard deviation was 0.6. The difference between these average standard deviations may be due in part to slightly differing operating conditions that were used for the two cases (bias voltages, etc.).

In addition to random noise in the pixel outputs there is fixed pattern noise. There are small, permanent, pixel-to-pixel variations in voltage offsets and photosensitivity due to variations in transistor thresholds, and due to random fluctuations in the physical features of the VLSI circuitry. The pixel-to-pixel signal variations seen in the 10-frame averages of the dark and bright outputs are largely due to fixed pattern noise. The standard deviation of the dark state output due to fixed pattern noise is 0.3. In the case of uniform illumination, the standard deviation of the fixed pattern noise was estimated to be about 2.5.

The test chip also contained a modified imager array that was used to determine the degree of cross talk between pixels. One of every four pixels of this chip was covered by an opaque metal light shield. These detectors were connected to a common output pin so that their photocurrents would be summed together. Each of the covered pixels was surrounded by 8 uncovered pixels. All of the uncovered pixels were connected to a second common output pin so that their photocurrents were summed as well. With uniform light falling on the array, the ratio of the two currents can be used to determine the crosstalk, i.e. to what extent does light falling on one pixel cause a signal to be produced in a neighboring pixel? The total current output from the covered pixels is $I_c=ni_c$ where n is the number of covered pixels and $i_c$ is the current produced by each. Although this assumption is probably incorrect, it was assumed that each of the surrounding 8 pixels contributes equally to crosstalk. In that case $i_c=8\beta i_U$ where $i_U$ is the photocurrent generated in a single uncovered pixel and β is the crosstalk factor. The total output current from covered pixels is therefor $I_c=n8\beta i_U$, and the total output from all uncovered pixels is $I_U=3ni_U$. The crosstalk factor β can be computed from the ratio of the output currents: $\beta=(3/8)(I_c/I_U)$. The result for our test array was β=0.006 when illuminated with incoherent green light. This level of crosstalk (approx. 1 part in 175) is comparable to the fixed pattern and random noise observed.

In applications requiring the best possible performance the fixed pattern noise and crosstalk can largely be removed by applying high speed digital signal processing to the analog data output from the imager. A table of offsets could be stored in memory and used to correct the imager data on a pixel-by-pixel basis. Crosstalk could be substantially reduced by implementing nearest neighbor digital deconvolution.

The integrated circuit containing the two SLMs and the APS imager was fabricated in a 0.5 μm CMOS process available through MOSIS of Marina Del Rey, Calif. Both 212×212 pixel SLMs are driven over a common 32 bit data bus and they are designed to run as fast as 8300 frames/s. The 256×256 pixel imager is designed to run as fast as 2000 frames/s. The imager's pixel voltages (proportional to light intensity) are multiplexed onto a set of four analog output voltages.

Figure 10A:
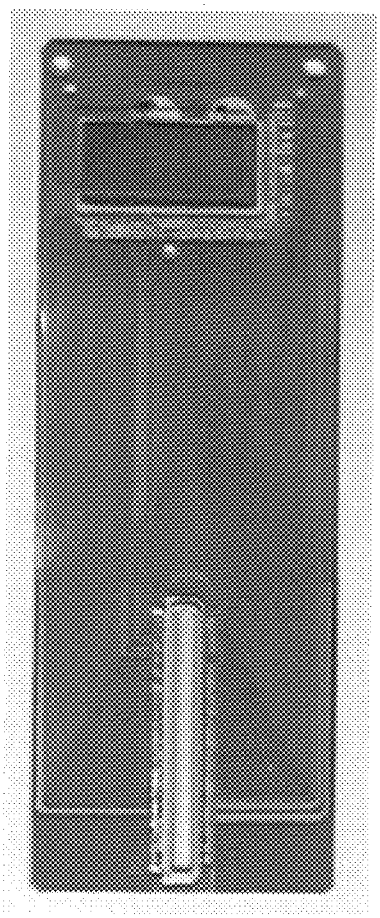
FIGS. 10*a* and 10*b* are photos of a prototype compound electro-optical component designed in accordance with the invention.
Figure 10B:
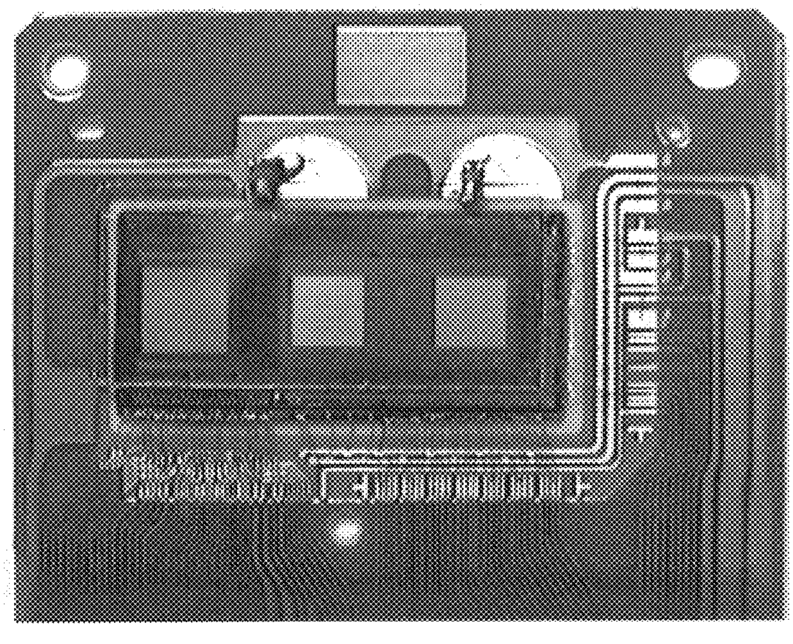

The integrated circuit die was attached to a ceramic plate used to mount it within the correlator. The ceramic plate, which is larger than the die, also serves as a backing for one end of a flexible circuit (flex) used as a cable to electrically connect the die to the correlator electronics. The flex contains a rectangular opening to accommodate the die, and the die is connected to the flex using standard wire bonds. A 100-pin connector is mounted at the other end of the flex circuit to mate with a rigid circuit board. This construction is illustrated in FIGS. 10*a* and 10*b* which are photos of the prototype described above.

Figure 11A:
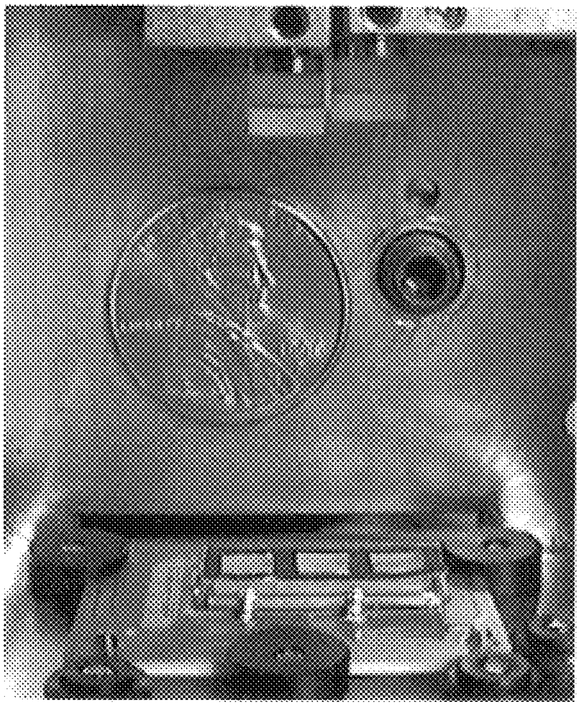
FIGS. 11*a* and 11*b* are close up photos of a prototype optical correlator using the compound electro-optical component of FIGS. 10*a* and 10*b* illustrating the relative size of the optical correlator and compound electro-optical component.
Figure 11B:
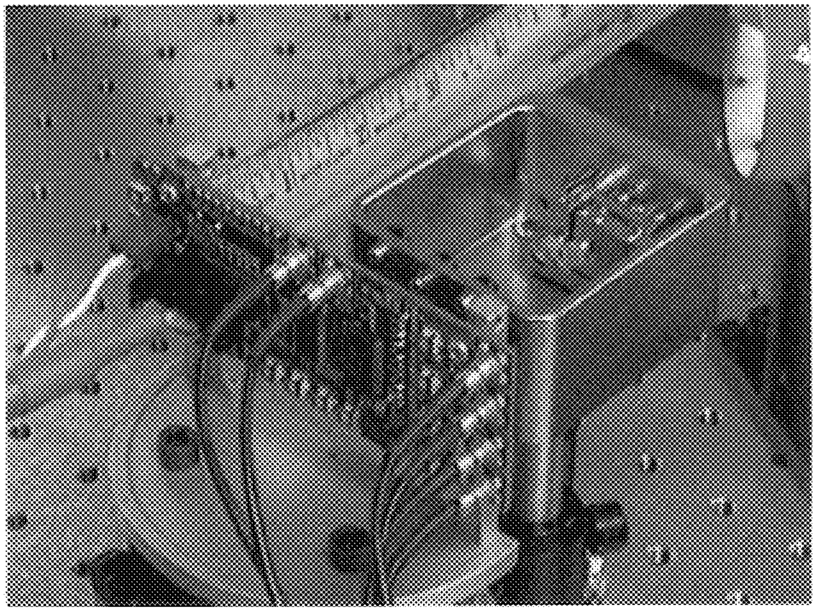

FIGS. 11*a* and 11*b* show the die-flex assembly mounted in its correlator subassembly and connected to an interface circuit board. FIG. 11*a* (approximately actual size, compare with FIGS. 5 and 6) shows the die and the two polarizing mirrors mounted in an invar chassis, the penny was included to indicate scale. The two mirrors were attached to kinematic mounts that allow tilt, z-rotation, and z-translation. As shown in the photo, one mirror was placed slightly farther from the die than the other to compensate for an error of a few percent in the focal length of the diffractive lenses attached to the die.

FIG. 11*b* shows the correlator subassembly mounted on an optical table and connected to the interface circuit board. A collimated laser beam enters the subassembly through a hole in the chassis that is just outside the top left portion of FIG. 11*a*. The flex circuit exits through a rectangular opening in the bottom of the subassembly and makes a 180° bend to mate with the circuit board. Optical alignment of the correlator subassembly was performed in this configuration for ease of access to the mirror adjustments before mounting it in the main housing.

Figure 12:
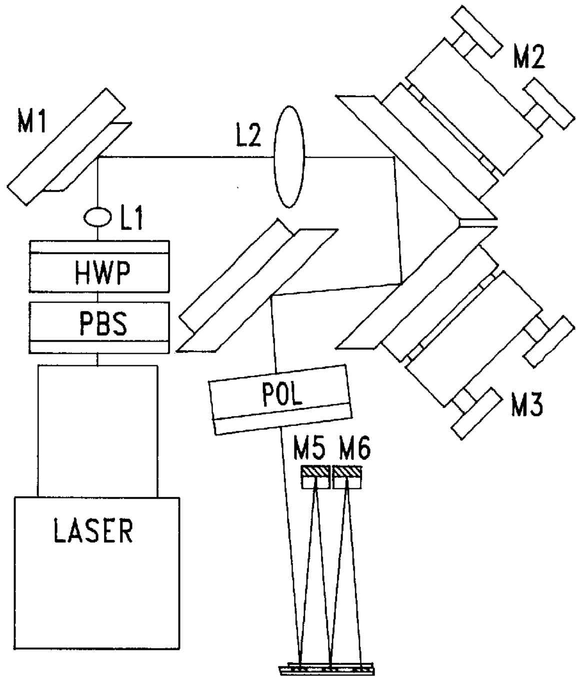
FIG. 12 is a schematic diagram showing the configuration of the overall optical correlator of FIGS. 11*a* and 11*b* including a source of coherent light.
Figure 13:
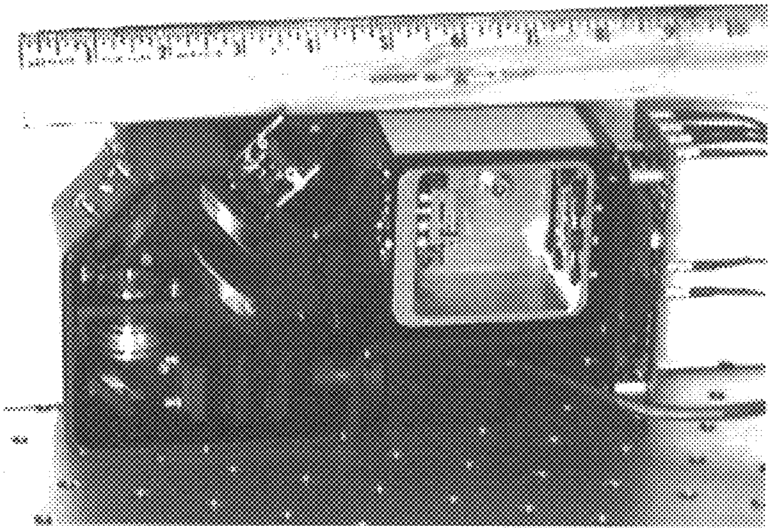
FIG. 13 is a photo of the overall prototype optical correlator of FIG. 11*a* and 11*b*.

FIG. 12 is a schematic diagram of the correlator prototype and FIG. 13 is a photograph of the completed correlator prototype. In addition to the subassembly described above, the prototype also contains a solid state diode pumped CW $Nd:YVO_4$ laser (532 nm), polarization control components, and lenses to expand and collimate the laser beam. The $Nd:YVO_4$ laser was used instead of a laser diode so that there was no need to worry about temperature tuning its wavelength as described above.

Reference letters PBS in FIG. 12 indicate a polarizing beam splitter used to reject the small amount of light emerging from the laser in the wrong polarization state. A half wave plate, indicated by reference letters HWP, is used in combination with a dichroic polarizer POL to control the intensity and polarization of light entering the correlator subassembly. The laser beam is expanded by diverging lens L1 and recollimated by lens L2. Mirrors M2 and M3 are used to properly align the laser beam with the subassembly.

As described above and as illustrated in FIG. 7, an interface card 170, plugged into the PCI bus of a standard PC, was designed to provide data and control signals to the correlator. When running at the full speed of the 32-bit wide PCI bus (33 MHz) the interface card can operate the correlator's SLMs at about 3400 frames/s (simultaneous update of both SLMs). However, when running under Windows 95™ the highest rate that can be achieved in practice is about 75% of the maximum due to computer architecture and operating system limitations. A commercial 4-channel data acquisition system 152 was modified to digitize analog data sent from the correlator's imager. Although the imager is designed to run as fast as 2000 frames/s, it was operated at only 240 frames/s during the tests. Running the imager at higher rates will require upgrading the data acquisition electronics.

The interface electronics mounted on the correlator housing demultiplexes data and control signals received from the computer, and distributes those signals to the SLMs and imager. The interface electronics also provide various bias voltages needed by the correlator, and buffers the four channels of analog image data sent to the data acquisition electronics.

Figure 14A:
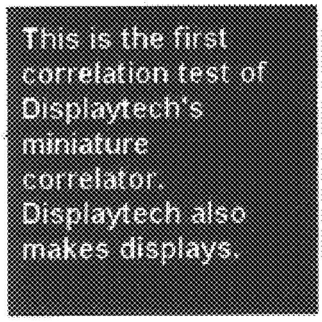
FIGS. 14*a–e* are simulated illustrations of sample inputs and outputs of the prototype optical correlator of FIG. 11*a* and 11*b*.
Figure 14B:
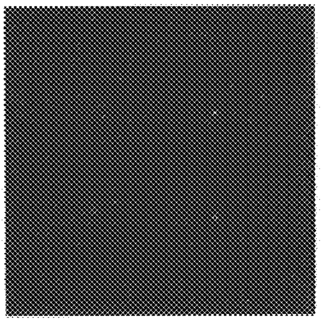
Figure 14C:
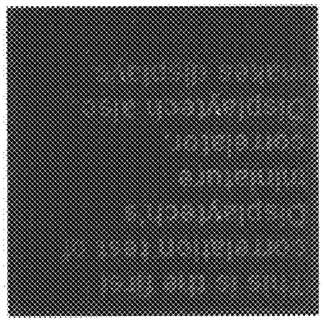
Figure 14D:
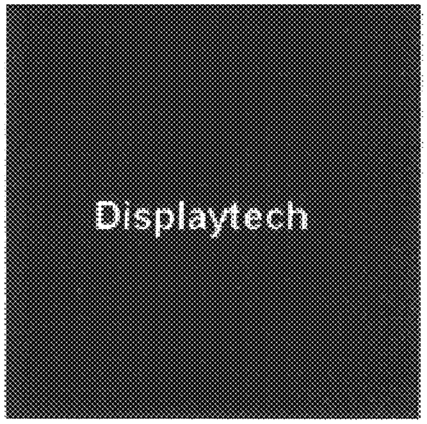
Figure 14E:
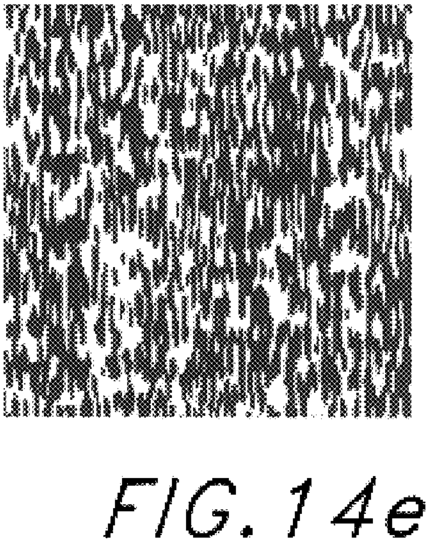

To demonstrate operation of the correlator, some lines of text were displayed on the first input SLM 104. A binary phase-only filter (BPOF) image corresponding to the word "Displaytech" was constructed for display on the second filter plane SLM 106. FIG. 14*a* shows a simulation of the lines of input text and FIG. 14*d* shows a simulation of the word to be used as a filter. The simulated image of FIG. 14*e* is the BPOF filter computed for "Displaytech". Black corresponds to a value of -1 and white corresponds to +1. The image of FIG. 14*b* is the simulated correlator output showing two bright spots corresponding to the two occurrences of "Displaytech" in the text; note that the correlator output is inverted. The image of FIG. 14*c* shows a simulation of what happens when the correlator's last polarizer is adjusted incorrectly. If this is the case, both the input text and the correlation spots are visible. This example shows the location of the correlation peaks relative to the text.

Figure 15A:
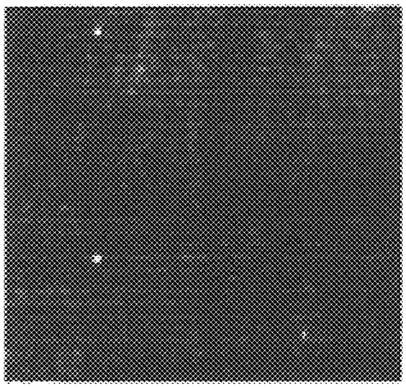
FIGS. 15*a* and 15*b* are illustrations of a portion of actual images as viewed by the imager of the prototype optical correlator of FIG. 11*a* and 11*b*.
Figure 15B:
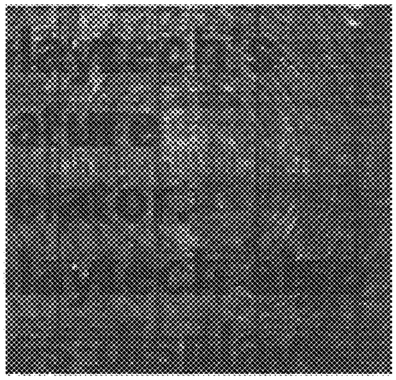

FIGS. 15*a* and 15*b* show a 128×128 pixel portion of the prototype correlator's output. These images are inverted relative to the simulated output of FIGS. 14*b* and 14*c*. The two correlation peaks are clearly evident in the image of FIG. 15*a*. A third, dimmer spot is visible in the lower right of the image due to a partial match with the word "displays". The image of FIG. 15*b* shows the correlator output after misadjusting the last polarizer. It should be compared to FIG. 14*c*. As predicted by the simulation, the correlation peak occurs on a segment of the letter "y".

Several imperfections are evident in the initial output images of this first prototype. The horizontal bands evident in the image of FIG. 15a are due to electrical noise. Much of this noise should be able to be eliminated through improvements to the electronics. Based on the experience from tests performed on a previous small scale version of the APS imager, the r.m.s. value of electrical noise is expected to be able to be reduced to 1% or less of the full scale output. The image of FIG. 15*b* shows a few inoperative columns of pixels in the input SLM. This was due to an intermittent connection through the flex cable's 100-pin connector. The rings evident in the FIG. 15*b* are due to shadowing of the steps in surface height of the diffractive lens located above the first SLM. Although this does not interfere seriously with the correlator's operation (it raises the noise level in the output) it could be eliminated, if necessary, by replacing the diffractive lens with a refractive lens. The refractive lens could lie above the SLM as in the current architecture, or it could be moved further away if its focal length is changed accordingly.

If optical correlators are to become commercially viable they must be small, inexpensive, and easy to use. The present invention described herein demonstrates the feasibility of achieving those goals through the integration of FLC-VLSI SLMs, CMOS APS imagers, and new optical fabrication techniques. The SLM/SLM/imager compound electro-optical component may be fabricated with the same manufacturing processes as used for low cost, commercial FLC-VLSI displays currently manufactured by Displaytech. The integration of SLMs, imager, and optics into a single integrated assembly in accordance with the invention reduces alignment problems and simplifies the correlator's opto-mechanical design.

Although only a few specific embodiments of an optical correlator have been described, it should be understood that the invention is not limited to these specific examples. Instead, the optical correlator may take on a variety of different specific configurations and still remain within the scope of the invention. For example, optical correlator 102 of FIGS. 2–6 has been described as using mirrors 128 and 132 to fold the optical paths between SLM 104 and 106 and between SLM 106 and optical imager 114 only once. However, this is not a requirement of the invention. Instead, as illustrated in FIGS. 16*a–c*, the optical path between these components may be folded multiple times and still fall within the scope of the invention.

Figure 16A:
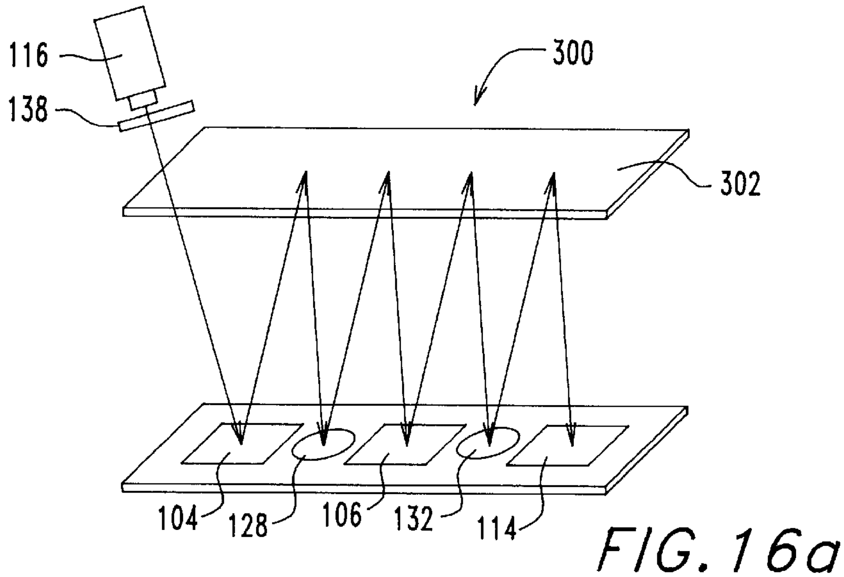
FIG. 16*a* is diagranmatic perspective view of an additional embodiment of an optical correlator in accordance with the invention including additional folding mirrors.

FIG. 16*a* illustrates an optical correlator 300 that, in addition to the components of optical correlator 102 of FIG. 2, includes at least one additional folding mirror 302. In this example, mirror 302 may be provided as one planar mirror. Alternatively, mirror 302 may be provided as multiple individual mirrors that are attached to a substrate such that the mirrors cooperate with SLM 104, SLM 106, optical imager 114, and mirrors 128 and 132 to fold the optical paths an additional time. This additional folding of the optical paths may be used to reduce the overall size of the optical correlator. Also, with this configuration, SLM 104, SLM 106, optical imager 114, and mirrors 128 and 132 may all be located in the same plane and be supported on the same substrate if desired.

Figure 16B:
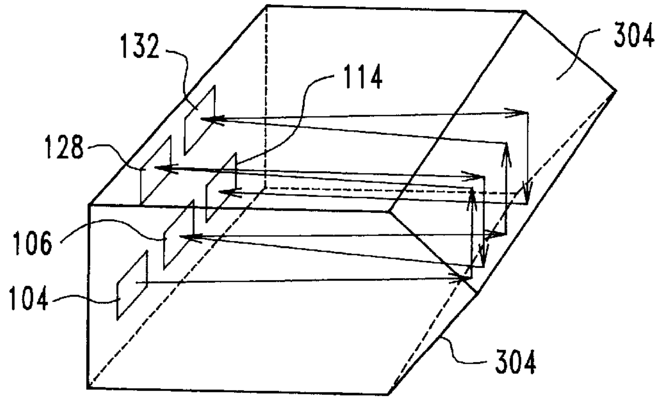
FIG. 16*b* is diagrammatic side view of a second embodiment of an optical correlator in accordance with the invention including additional folding mirrors.
Figure 16C:
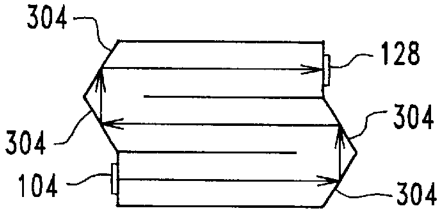
FIG. 16*c* is diagrammatic side view of a third embodiment of an optical correlator in accordance with the invention including additional folding mirrors.

In another example illustrated in FIG. 16*b*, mirror 302 of FIG. 16*a* is replaced with two diagonally positioned mirrors 304. These diagonally positioned mirrors provide the same function as mirror 302. However, they shift the optical paths laterally so that mirrors 128 and 132 may be offset or located to the side of SLM 104, SLM 106, and imager 114 rather than being located in line with these components as was the case in FIG. 16*a*. Additionally, as illustrated in FIG. 16*c*, the optical path may be folded multiple times using these methods.

The embodiments described above treat the specific case of a symmetrical optical system which is appropriate for correlators built from SLMs and imagers whose pixels have equal pitches. Based on the above description, it should be readily apparent to those skilled in the art that it is not a requirement of the invention to use SLMs and imagers whose pixels have equal pitches. Instead, non-equal pixel pitches may be accommodated by not maintaining the mirrors in a common plane, by adjusting the mutual disposition of the SLMs and imager, by changing the focal length of the lenses and by altering the angles of the beam. All of these various configurations would equally fall within the scope of the invention.

Additionally, the systems described above include the use of a coherent light source 116 such as a laser that produces collimated light or light having a planar input wavefront. Again, this is not a requirement of the invention. Instead, as will now be described, other types of light sources that do not produce collimated light or a planar input wavefront may be used. To compensate for this curved wavefront, the lenses of the optics arrangement of the optical correlator may be used to collimate the input light. A specific example of this will be described with reference to FIG. 17 which illustrates an optical correlator 400.

Figure 17:
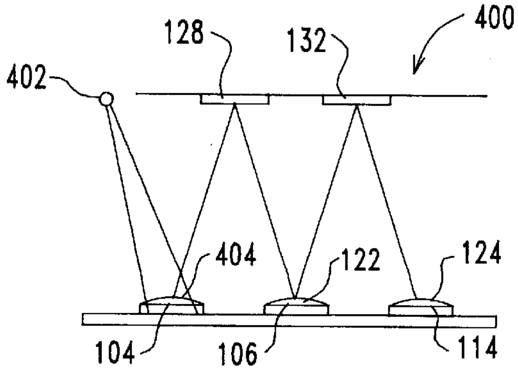
FIG. 17 is a diagrammatic side view of another embodiment of an optical correlator in accordance with the invention that includes a point source of light.

As shown in FIG. 17, optical correlator 400 includes all of the same components described above with reference to FIGS. 1–2 and 4–6 with two exceptions. First, coherent light source 116 is replaced with a light source 402. Light source 402 may take the form of a laser diode, the output end of a fiber optic cable, or any other suitable light source capable of producing coherent light. However, light source 402 is not required to provide collimated light or light having a planar input wavefront. Second, first lens 120 is replaced with a different lens 404 that is designed to both collimate the light entering SLM 104 and perform the Fourier transform described above for lens 120.

With the configuration of FIG. 17, the focal length f1 of lens 404 is either increased or decreased to compensate for the curvature of the input wavefront. This can have the practical advantage of shaping a beam from a diverging light source such as an optical fiber or a laser diode. This can help reduce the complexity of the system by eliminating the requirement for a separate collimating lens. Also, working with a diverging beam may help reduce wavefront degradation that might otherwise occur when a parallel ray planar wavefront passes other components. For example, the sharp intensity drop of the plane wave's edges, as it passes apertures and other components, can cause diffractive ripples in the wavefront thus degrading its uniformity.

The idea behind choosing a focal length for the first lens of the correlator, in this case lens 404, is that it should image a point source of light (i.e. light source 402) onto the filter plane (i.e. SLM 106). As described above for the previous embodiments, f represents the distance along the optical path from lens 404 to SLM 106. As also described above, f is determined by $f=Np_1p_2/\lambda$ where N is the number of pixels per edge of the SLMs, $p_1$ is the pixel pitch of the input SLM, $p_2$ is the pixel pitch of the filter SLM, and $\lambda$ is the wavelength of light being used. However, in order to compensate for curved wavefront from the light source 402, the focal length f1 of lens 404 is chosen so that $1/f1=1/d+1/f$ where d is the distance from the input SLM 104 to light source 402. The distance d can be positive or negative. A positive distance means the light from the source is diverging as it approaches the input SLM and a negative distance means that the light is converging as it approaches the input SLM. In the case in which a planar wavefront is used, d would be equal to infinity. This basic approach can be generalized for correlator designs other than 2*f* correlators in which the distance from the first lens to the filter plane is not equal to the distance from the filter plane to the image plane. It may also be generalized for designs containing additional lenses.

Additionally, although the some of the embodiments described above have included specific types of polarizers associated with the mirrors, this is not a requirement of the invention. Instead, other polarization manipulating elements such as other types of polarizers, retarders, various types of wave plates, or other optical elements may be positioned at the mirrors or along the optical path depending on the requirements of the specific application in which the device is to be used. As is known in the art, these various configurations may be used to change the specific functionality of the overall device. Some examples of altered functionality may be found, for instance, in U.S. Pat. No. 5,859,728, issued to Colin et al. Also, although the polarizers have been described above as having a particular orientation to result in either phase modulation or amplitude modulation, different orientations of the two polarizers may be also be used. All of these various configurations would equally fall within the scope of the invention so long as the SLMs were provided on a single integrated circuit die or so long as the correlator were provided as a bi-planar, 2f system as described above.

Furthermore, although the above described embodiments have been described with the various components having particular respective orientations, it should be understood that the present invention may take on a wide variety of specific configurations with the various components being located in a wide variety of positions and mutual orientations and still remain within the scope of the present invention. Therefore, the present examples are to be considered as illustrative and not restrictive, and the invention is not to be limited to the details given herein, but may be modified within the scope of the appended claims.

What is claimed is:

1. An optical correlator comprising:

a) a compound electro-optical component including a first and a second reflective spatial light modulator for forming electro-optical patterns of light, each spatial light modulator having a reflective backplane, the spatial light modulators being substantially coplanar, and the spatial light modulators having their individual respective backplanes formed as two separate portions of a single integrated circuit die; and b) an optics arrangement for (i) directing light from a source of light into the first spatial light modulator, (ii) directing light along a first optical path from the first spatial light modulator into the second spatial light modulator, and (iii) directing light along a second optical path from the second spatial light modulator into an optical image plane.

2. An optical correlator according to claim 1 wherein the optics arrangement includes at least one mirror for folding the first and second optical paths.

3. An optical correlator comprising:

a) a compound electro-optical component including a first and a second reflective spatial light modulator for forming electro-optical patterns of light, each spatial light modulator having a reflective backplane, the spatial light modulators being substantially coplanar, and the spatial light modulators having their individual respective backplanes formed as two separate portions of a single integrated circuit die; and b) an optics arrangement for (i) directing light from a source of light into the first spatial light modulator, (ii) directing light along a first optical path from the first spatial light modulator into the second spatial light modulator, and (iii) directing light along a second optical path from the second spatial light modulator into an optical image plane, wherein the optics arrangement includes a plurality of mirrors for folding both the first and second optical paths a plurality of times.

4. An optical correlator according to claim 3 wherein at least some of the plurality of mirrors are located substantially coplanar with and adjacent to the compound electro-optical component.

5. An optical correlator according to claim 4 wherein the mirrors that are substantially coplanar and adjacent to the compound electro-optical component are supported on the same substrate as the compound electro-optical component.

6. An optical correlator comprising:

a) a first reflective mode spatial light modulator for inputting an input image, b) a second reflective mode spatial light modulator for inputting a reference image for comparing with the input image; and c) an optics arrangement for (i) directing light into the first spatial light modulator, (ii) directing light along a first optical path from the first spatial light modulator into the second spatial light modulator, and (iii) directing light along a second optical path from the second spatial light modulator into an image plane, the optics arrangement including a first lens having a focal length f1 and a second lens having a focal length f2, the first lens being positioned substantially adjacent the first spatial light modulator and the second lens being positioned substantially adjacent the second spatial light modulator such that the length of the first optical path from the first lens to the second spatial light modulator is not substantially equal to the length of the second optical path from the second lens to the image plane.

7. An optical correlator comprising:

a) a first reflective mode spatial light modulator for inputting an input image, b) a second reflective mode spatial light modulator for inputting a reference image for comparing with the input image; and c) an optics arrangement for (i) directing light into the first spatial light modulator, (ii) directing light along a first optical path from the first spatial light modulator into the second spatial light modulator, and (iii) directing light along a second optical path from the second spatial light modulator into an image plane, the optics arrangement including a first lens having a focal length f1 and a second lens having a focal length f2, the first lens being positioned substantially adjacent the first spatial light modulator and the second lens being positioned substantially adjacent the second spatial light modulator such that the length of the first optical path from the first lens to the second spatial light modulator is not substantially equal to the length of the second optical path from the second lens to the image plane;

wherein:

a) the first and second spatial light modulators include pixel arrays of individually addressable pixels, the first and second spatial light modulators having pixel arrays with the same number of pixels along corresponding edges of the spatial light modulators with the pixel arrays of the first and second spatial light modulators having pixel pitches of P1 and P2 respectively; and b) the focal length f1 of the first lens is selected such that the first lens is able to image a point source of light in the plane in which the second spatial light modulator is located.

8. An optical correlator comprising:

a) a first reflective mode spatial light modulator for inputting an input image, b) a second reflective mode spatial light modulator for inputting a reference image for comparing with the input image; and c) an optics arrangement for (i) directing light into the first spatial light modulator, (ii) directing light along a first optical path from the first spatial light modulator into the second spatial light modulator, and (iii) directing light along a second optical path from the second spatial light modulator into an image plane, the optics arrangement including a first lens having a focal length f1 and a second lens having a focal length f2, the first lens being positioned substantially adjacent the first spatial light modulator and the second lens being positioned substantially adjacent the second spatial light modulator such that the length of the first optical path from the first lens to the second spatial light modulator is not substantially equal to the length of the second optical path from the second lens to the image plane;

wherein the first optical path from the first lens to the second spatial light modulator has a length of f where f is determined by $$f = N\ P1\ P2/\lambda$$

with N being the number of pixels per edge of the array of pixels of the spatial light modulators and $\lambda$ being the wavelength of the light being used in the optical correlator.

9. An optical correlator according to claim 8 wherein:

a) the optics arrangement includes a point source of light located a distance d from the first lens;

b) the focal length f1 of the first lens is determined by $$1/f1=1/d+1/f.$$

10. An optical correlator according to claim 6 wherein the first spatial light modulator and the second spatial light modulator are ferroelectric liquid crystal reflective spatial light modulators.

* * * * *

UNITED STATES PATENT AND TRADEMARK OFFICE

CERTIFICATE OF CORRECTION

PATENT NO. : 6,369,328 B1 
DATED : April 9, 2002
INVENTOR(S) : Takeo Munakata

It is certified that error appears in the above-identified patent and that said Letters Patent is hereby corrected as shown below:

Column 32,
Line 46, please delete "6" and insert therefore, -- 19 --.

Signed and Sealed this

Twenty-first Day of January, 2003

JAMES E. ROGAN
*Director of the United States Patent and Trademark Office*